United States Patent
Ohara et al.

(10) Patent No.: US 12,006,252 B2
(45) Date of Patent: Jun. 11, 2024

(54) CHEMICALLY STRENGTHENED GLASS WITH A FILM AND METHOD FOR MEASURING SURFACE STRESS OF CHEMICALLY STRENGTHENED GLASS

(71) Applicant: AGC Inc., Tokyo (JP)

(72) Inventors: Seiki Ohara, Tokyo (JP); Shunji Wachi, Tokyo (JP); Hironobu Sato, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 17/469,139

(22) Filed: Sep. 8, 2021

(65) Prior Publication Data

US 2022/0073425 A1 Mar. 10, 2022

(30) Foreign Application Priority Data

Sep. 9, 2020 (JP) ................................ 2020-151342

(51) Int. Cl.
| | |
|---|---|
| *C03C 21/00* | (2006.01) |
| *C03C 17/28* | (2006.01) |
| *C03C 17/30* | (2006.01) |
| *C03C 17/32* | (2006.01) |
| *G01L 1/24* | (2006.01) |

(52) U.S. Cl.
CPC ............ *C03C 21/002* (2013.01); *C03C 17/28* (2013.01); *C03C 17/30* (2013.01); *C03C 17/32* (2013.01); *G01L 1/24* (2013.01); *C03C 2217/732* (2013.01); *C03C 2218/151* (2013.01)

(58) Field of Classification Search
CPC ...... C03C 21/001–003; C03C 2217/73; C03C 2217/732; C03C 2217/75; C03C 2217/76; G02B 1/11–14; G02B 1/18
See application file for complete search history.

(56) References Cited

U.S. PATENT DOCUMENTS

| | | | |
|---|---|---|---|
| 9,487,434 B2 | 11/2016 | Amin et al. | |
| 2017/0311466 A1* | 10/2017 | Memering | H05K 5/03 |
| 2018/0088399 A1* | 3/2018 | Fukushi | C03B 23/0357 |
| 2018/0306658 A1 | 10/2018 | Orihara et al. | |
| 2019/0248702 A1* | 8/2019 | Lee | B24B 37/08 |
| 2020/0109083 A1* | 4/2020 | Imakita | C03C 3/091 |
| 2020/0148591 A1* | 5/2020 | Andrews | C03C 4/20 |
| 2020/0369560 A1* | 11/2020 | Takeda | B32B 7/025 |
| 2021/0257583 A1* | 8/2021 | Park | H10K 50/87 |
| 2021/0323862 A1* | 10/2021 | Kanehara | C03C 3/095 |

FOREIGN PATENT DOCUMENTS

| | | | | |
|---|---|---|---|---|
| JP | 59-37451 B2 | 9/1984 | | |
| JP | 6713651 B2 | 6/2020 | | |
| WO | WO-2019159983 A1 * | 8/2019 | ............ | C03C 17/42 |

* cited by examiner

*Primary Examiner* — Z. Jim Yang
(74) *Attorney, Agent, or Firm* — Oblon, McClelland, Maier & Neustadt, L.L.P.

(57) ABSTRACT

The present invention relates to a chemically strengthened glass with a film, including: a chemically strengthened glass having a pair of main surfaces opposing each other; and a film formed on at least one of the main surfaces of the chemically strengthened glass, in which the chemically strengthened glass has two or less interference fringes observed under stress measurement utilizing surface propagation light having a wavelength of 365 nm, and the film has a refractive index lower than a refractive index of the chemically strengthened glass.

11 Claims, 5 Drawing Sheets

CHEMICALLY STRENGTHENED GLASS WITH A FILM AND METHOD FOR MEASURING SURFACE STRESS OF CHEMICALLY STRENGTHENED GLASS

TECHNICAL FIELD

The present invention relates to chemically strengthened glass with a film and a method for measuring surface stress of chemically strengthened glass.

BACKGROUND ART

Chemically strengthened glass is used as cover glasses of electronic devices such as portable terminals.

Chemically strengthened glass is glass in which a compressive stress layer is formed in a surface layer of the glass by, for example, bringing glass into contact with molten salt containing alkali metal ions and thereby causing ion exchange between alkali metal ions in the glass and alkali metal ions in the molten salt. The strength of chemically strengthened glass thus obtained strongly depends on its stress profile.

The cover glass of a portable terminal or the like may be broken due to deformation that occurs when, for example, the terminal is dropped. To prevent such breaking, that is, bending-mode braking, it is effective to increase the compressive stress at the glass surface.

There may also occur a case that the cover glass of a portable terminal or the like is broken due to collision with a projection when is dropped onto an asphalt surface or sand. To prevent such breaking, that is, impact-mode braking, it is effective to increase the depth of a compressive stress layer to form a compressive stress layer to a deeper portion of glass.

More specifically, the probability of occurrence of bending-mode braking can be suppressed by producing large compressive stress in a surface portion of glass by sodium ion-potassium ion exchange. The probability of occurrence of impact-mode braking can also be suppressed by further producing a little small compressive stress in a deeper portion of the glass by lithium ion-sodium ion exchange.

However, when a compressive stress layer is formed in a surface portion of glass, tensile stress corresponding to the surface compressive stress is necessarily produced in a central portion of the glass. If the tensile stress is too large, when the glass is broken the breaking tends to be so violent that fragments are scattered.

It is desired to prevent glass from being broken so violently that fragments are scattered while suppressing the probabilities of occurrence of both of bending-mode braking and impact-mode braking. For such purpose, it is conceivable to increase the compressive stress at the glass surface and form a compressive stress layer to a deeper portion and, at the same time, make the depth of compressive stress produced in a glass surface portion by sodium ion-potassium ion exchange smaller.

Patent document 1 discloses, as chemically strengthened glass that is high in strength and low in the degree of scattering of fragments, chemically strengthened glass produced by two-step ion exchange treatment.

CITATION LIST

Patent Literature

[Patent document 1] U.S. Pat. No. 9,487,434
[Patent document 2] JP-B-S59-37451
[Patent document 3] Japanese Patent No. 6,713,651

Technical Problems

In general, stress in a region, in which sodium ions have been replaced by potassium ions, in a glass surface layer is determined from interference fringes obtained utilizing light that propagates through the glass surface layer, that is, surface propagation light (refer to Patent document 2). However, it has been found that interference fringes become unclear if the depth of compressive stress produced by potassium ions in a glass surface portion is made extremely smaller than before.

The number of interference fringes observed can be increased by making the wavelength of surface propagation light shorter. However, even when light having a wavelength of 365 nm is used, there may occur a case that the number of interference fringes observed is two or less. Particularly when the number of interference fringes observed is two or less, the fringes are unclear and hence it is very difficult to determine compressive stress at the glass surface.

SUMMARY OF INVENTION

In view of the above, an object of the present invention is to provide a new method for measuring surface stress of chemically strengthened glass for which measurement of compressive stress at the surface is very difficult or impossible because interference fringes observed utilizing surface propagation light are unclear, as well as chemically strengthened glass with a film that enables such measurement.

Making diligent studies, the present inventors have found that the above problems can be solved by forming a film that is lower in refractive index than chemically strengthened glass on a main surface of the chemically strengthened glass. This is opposite to the conventional knowledge that to perform measurement utilizing surface propagation light an immersion liquid that is equivalent to or higher than target glass in refractive index should be applied to the glass surface. This will be described below in a specific manner.

Where chemically strengthened glass is used in a display unit of an electronic device such as a cellphone or a smartphone, a film may be formed on a main surface of the chemically strengthened glass to provide an antiglare effect, an antibacterial effect, an antifouling effect, or the like. Such a film is lower in refractive index than the chemically strengthened glass.

It was thought conventionally that when an antiglare film, an antibacterial film, an antifouling film, or the like is formed on the chemically strengthened glass for these purposes, observation of interference fringes produced by surface propagation light would be more difficult than a case of chemically strengthened glass on which a film is not formed (refer to Patent document 3).

The present inventors have found that in a case where interference fringes obtained utilizing surface propagation light are unclear because the depth of compressive stress produced by potassium ions in a surface of chemically strengthened glass is very small, formation of a low refractive index film rather increases the clearness of interference fringes contrary to the above knowledge.

The present invention provides the followings:

[1] A chemically strengthened glass with a film, including:
 a chemically strengthened glass having a pair of main surfaces opposing each other; and a film formed on at least one of the main surfaces of the chemically strengthened glass, in which the chemically strengthened glass has two or less interference fringes observed under stress measurement utilizing surface propagation light having a wavelength of 365 nm, and the film has a refractive index lower than a refractive index of the chemically strengthened glass.

[2] The chemically strengthened glass with a film according to item [1], in which a difference between the refractive index of the film and the refractive index of the chemically strengthened glass is in a range of 0.02 to 0.30.

[3] The chemically strengthened glass with a film according to item [1] or [2], in which a stress depth of a deep layer of the chemically strengthened glass is 0.1×t or more, where t is a thickness of the chemically strengthened glass.

[4] The chemically strengthened glass with a film according to any one of items [1] to [3], in which the chemically strengthened glass has a base composition including 5 mol % or more of $Li_2O$ in mole percentage on an oxide basis.

[5] The chemically strengthened glass with a film according to any one of items [1] to [4], in which the film has a thickness in a range of 2 nm to 50 nm.

[6] The chemically strengthened glass with a film according to any one of items [1] to [5], in which the film includes a fluorine-based organic compound.

[7] A surface stress measuring method for a chemically strengthened glass having a pair of main surfaces opposing each other, the method including:

obtaining a chemically strengthened glass with a film by forming a film having a refractive index lower than a refractive index of the chemically strengthened glass on at least one of the main surfaces of the chemically strengthened glass; and measuring a surface compressive stress of the chemically strengthened glass by performing stress measurement utilizing surface propagation light on the chemically strengthened glass with a film, in which the chemically strengthened glass has two or less interference fringes observed under stress measurement utilizing surface propagation light having a wavelength of 365 nm.

[8] The surface stress measuring method for chemically strengthened glass according to item [7], in which the surface propagation light to be applied to the chemically strengthened glass with a film has a wavelength of 650 nm or less.

The present invention can provide chemically strengthened glass that makes it possible to measure compressive stress at the glass surface utilizing surface propagation light even if the depth of compressive stress produced by potassium ions in a surface portion is very small. The present invention can also provide a new surface stress measuring method for such chemically strengthened glass.

DETAILED DESCRIPTION OF EMBODIMENT

<Chemically Strengthened Glass with Film>

Figure 1:
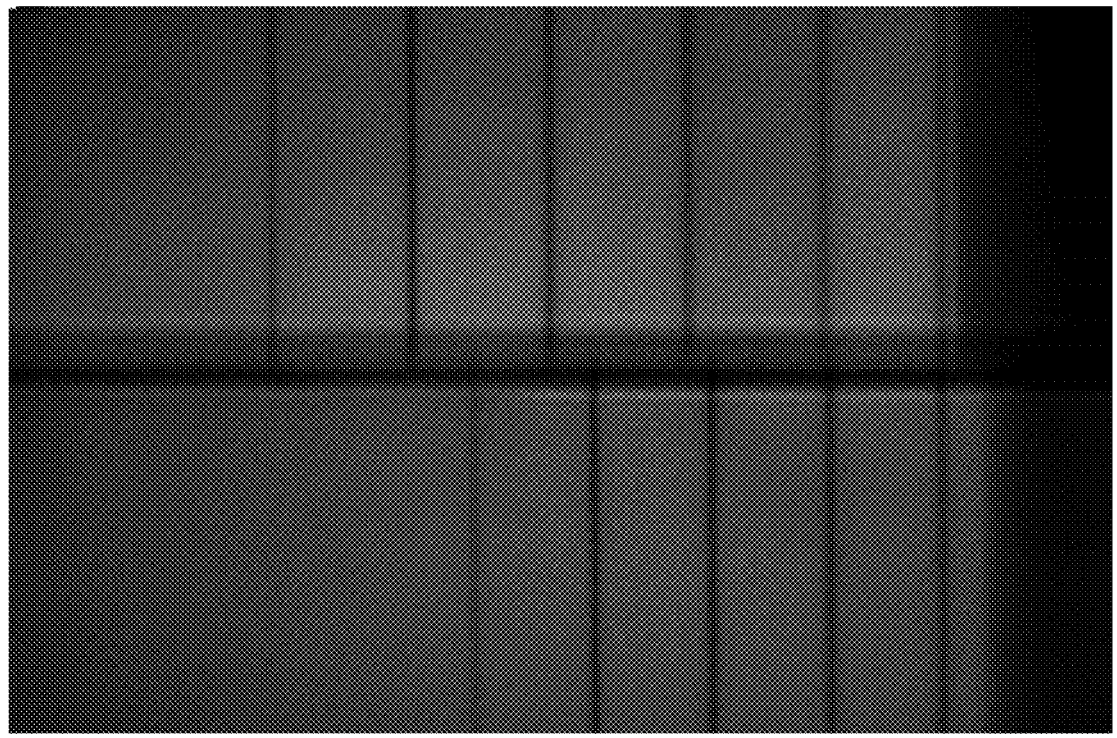
FIG. 1 shows an image of interference fringes obtained by performing measurement on chemically strengthened glass of Example 1 using a surface stress meter.

A chemically strengthened glass with a film of an embodiment includes a chemically strengthened glass having a pair of main surfaces opposing each other and a film formed on at least one of the main surfaces. The chemically strengthened glass has two or less interference fringes observed under stress measurement utilizing surface propagation light having a wavelength of 365 nm. The film formed on at least one of the main surfaces of the chemically strengthened glass has a refractive index lower than a refractive index of the chemically strengthened glass.

The chemically strengthened glass has two or less interference fringes observed under stress measurement utilizing surface propagation light having a wavelength of 365 nm. In this description, the feature that the number of interference fringes is two or less means that no interference fringe is observed or the number of interference fringes observed is one or two.

Surface compressive stress and its depth are calculated from an interval of observed interference fringes. If the number of interference fringes is three or more, the amount of information is large, whereby the accuracy of surface compressive stress and its depth calculated is high. On the other hand, if the number of interference fringes is two or less, the interference fringes are prone to be unclear and hence it is difficult to calculate surface compressive stress and its depth. Example wavelengths of surface propagation light used for stress measurement are 790 nm, 596 nm, 365 nm, etc., and observed interference fringes become clearer and increased in number as the wavelength becomes shorter. In this specification, the expression "interference fringes are unclear" means that observed interference fringes are so unclear that surface compressive stress cannot be determined automatically by detecting positions and an inclination angle of the interference fringes when stress measurement is performed using surface propagation light having a wavelength of 365 nm.

However, where the depth of compressive stress produced by potassium ions in a surface portion of chemically strengthened glass is extremely small, interference fringes are unclear and the number thereof become two or less even if surface propagation light having a wavelength of 365 nm is used. In this case, surface compressive stress and its depth cannot be determined properly.

The reason why interference fringes are unclear when the depth of compressive stress produced by potassium ions is extremely small are inferred as follows.

The stress measurement utilizing surface propagation light is a method of measuring stress using interference fringes of light propagating through a high refractive index region, produced by replacement of sodium ions with potassium ions, of a glass surface. It is therefore considered that if a region where light can propagate is narrow, propagation light expands to make interference fringes unclear. This can be explained by referring to a phenomenon of an optical fiber where light propagates through the core having a high refractive index as the similar case.

There are following two factors in increasing the beam diameter in an optical fiber:
  (i) The core diameter which determines a light propagation region is small, that is, a region having a high refractive index is narrow.
  (ii) The difference between the refractive indices of the core and the cladding is small.

The following two factors in making interference fringes wider and unclear are obtained by applying the above two factors to stress measurement utilizing surface propagation light:
  (i') The stress layer to serve as a light propagation region is shallow.
  (ii') The surface compressive stress is small.

That is, it is considered that if the compressive stress produced by potassium ions introduced by ion exchange, that is, the surface compressive stress of the glass is small and its depth is small, the light propagation region becomes narrow and propagation light expands, whereby interference fringes become unclear.

If a film (hereinafter also referred to as "low refractive index film") that is lower in refractive index than such chemically strengthened glass is formed on at least one of its main surfaces, when stress measurement is performed utilizing surface propagation light having a wavelength of 365 nm, resulting interference fringes become clear even if the number thereof is only two, enabling automatic measurement of surface compressive stress.

This phenomenon is opposite to the conventional knowledge that if an antiglare film, an antibacterial film, an antifouling film, or the like that is lower in refractive index than chemically strengthened glass is formed on its main surface, observation of interference fringes produced by surface propagation light would become more difficult than in a case of chemically strengthened glass on which no such film is formed.

This is considered due to the fact that when the depth of surface compressive stress of chemically strengthened glass is very small the region where the refractive index is changed by chemical strengthening is small.

That is, it is inferred that in contrast to fact that the refractive index variation region is small and propagation light expands in the case where the depth of surface compressive stress is very small, the expansion of propagation light can be suppressed by forming a low refractive index film.

The advantage that the presence of a low refractive index film enables observation of clear interference fringes can be obtained irrespective of the kind and the number of low refractive index films and presence of another layer.

More specifically, either only one kind of low refractive index film or two or more kinds of low refractive index films may be formed and only one kind of low refractive index film may be formed in the form of plural layers. Furthermore, a low refractive index film may be formed directly on a main surface of chemically strengthened glass or another layer may be formed between chemically strengthened glass and a low refractive index film. The other layer may be a film (hereinafter may be referred to as a "high refractive index film") that is higher in refractive index than the chemically strengthened glass.

The low refractive index film is formed on at least one of the main surfaces of the chemically strengthened glass and may be formed on both main surfaces.

The advantage that interference fringes of chemically strengthened glass with a film become clear is due to the refractive index distribution. It is therefore preferable that chemically strengthened glass and a film(s) be arranged in order of chemically strengthened glass-low refractive index film, glass-low refractive index film-high refractive index film, glass-high refractive index film-low refractive index film, glass-high refractive index film-low refractive index film-high refractive index film, or the like.

From the viewpoint of suppressing expansion of propagation light, it is preferable that the difference $(n_g-n_m)$ between the refractive index $n_g$ of the chemically strengthened glass and the refractive index nm of the low refractive index film be 0.02 or more, even preferably 0.03 or more, further preferably 0.05 or more, and even further preferably 0.07 or more. On the other hand, from the viewpoint of preventing a phenomenon that stress measurement using a surface stress meter is made difficult due to total reflection at the interface between the chemically strengthened glass and the low refractive index film, it is preferable that the refractive index difference $(n_g-n_m)$ be 0.30 or less, even preferably 0.25 or less, further preferably 0.20 or less, and even further preferably 0.15 or less.

A refractive index $n_g$ of chemically strengthened glass and a refractive index nm of a low refractive index film are measured by a refractive index meter.

(Chemically Strengthened Glass)

There are no particular limitations on the glass to be subjected to chemically strengthening treatment as long as chemically strengthening treatment can be performed on it; for example, it is preferable that the glass to be subjected to chemically strengthening treatment contain alkali metals having small ion radii such as lithium and sodium. Examples of such glass are aluminosilicate glass, soda-lime silicate glass, borosilicate glass, lead glass, alkali barium glass, and alumino-borosilicate glass.

In this specification, glass that has been subjected to chemically strengthening treatment is referred to as "chemically strengthened glass." The base composition of chemically strengthened glass is the same as the composition of the glass that have not been subjected to the chemically strengthening treatment yet. The term "base composition of chemically strengthened glass" means the composition of the inside of the glass that does not include a layer that has been subjected to ion exchange by the chemically strengthening treatment.

The range of surface stress depth at which the number of observed interference fringes is two or less is not determined uniquely because it varies depending on the base composition, the surface compressive stress, and the depth of diffused potassium ions of chemically strengthened glass.

However, for example, the surface stress depth at which the number of observed interference fringes is two or less is approximately 4 μm or less in a case where common glass containing alkali ions has been subjected to chemically strengthening treatment. Although there are no particular limitations on the lower limit of the surface stress depth, the surface stress depth is, for example, 1.8 μm or more.

For example, the surface compressive stress at which the number of observed interference fringes is two or less is approximately 1,200 MPa or less in a case where common glass containing alkali ions has been subjected to chemically strengthening treatment. Although there are no particular limitations on the lower limit of the surface compressive stress, in view of the use as a cover glass, it is preferable that the surface compressive stress be 400 MPa or more, even preferably 550 MPa or more and further preferably 700 MPa or more.

Values of the above-mentioned surface compressive stress and surface stress depth are determined by a surface stress meter utilizing surface propagation light, that is, a light guiding surface stress meter. A deep layer stress depth (described later) of chemically strengthened glass is determined by a scattered light photoelastic stress meter.

Although a light guiding surface stress meter can measure stress correctly in a short time, it can measure stress only in a case that the refractive index decreases from the surface toward the inside of a sample. Thus, it is suitable for measurement of surface compressive stress of chemically strengthened glass in which sodium ions have been replaced by potassium ions by ion exchange. A specific example of the light guiding surface stress meter is "FSM-6000" produced by Orihara Industrial Co., Ltd.

Although a scattered light photoelastic stress meter can measure stress irrespective of the refractive index distribution, it is prone to be influenced by surface scattering and hence sometimes cannot measure stress in vicinity of the surface correctly. Thus, it is suitable for measurement of stress in a deep layer, in which lithium ions have been replaced by sodium ions by ion exchange, of chemically strengthened glass. A specific example of the scattered light photoelastic stress meter is "SLP2000" produced by Orihara Industrial Co., Ltd.

That is, a correct stress profile can be obtained by combining a light guiding surface stress meter and a scattered light photoelastic stress meter.

There are no particular limitations on the refractive index $n_g$ of the chemically strengthened glass as long as it is higher than that of the low refractive index film. From the viewpoint of preventing a situation that measurement of stress by a surface stress meter is difficult because of total reflection at the boundary between the chemically strengthened glass and the low refractive index film, it is preferable that the refractive index $n_g$ be 1.30 or more, even preferably 1.35 or more and further preferably 1.40 or more. From the viewpoint of suppressing expansion of propagation light, it is preferable that the refractive index $n_g$ be 1.54 or less, even preferably 1.52 or less, further preferably 1.50 or less, and even further preferably 1.48 or less.

As a large compressive stress is produced in the chemically strengthened glass due to ion exchange of sodium ions in a surface portion and potassium ions, it is preferable that its base composition includes $Na_2O$. It is preferable that the content of $Na_2O$ be 2 mol % or more, even preferably 3 mol % or more, further preferably 4 mol % or more, and even further preferably 5 mol % or more. There are no particular limitations on the upper limit of the content of $Na_2O$. From the viewpoint of increasing the stress in a glass deep portion, it is preferable that the content of $Na_2O$ be 12 mol % or less, even preferably 10 mol % or less and further preferably 8 mol % or less. In this specification, the base composition of the chemically strengthened glass is expressed in mole percentage on an oxide basis unless otherwise specified.

It is preferable that the surface compressive stress and the surface stress depth be in the above-mentioned preferable ranges as a result of ion exchange with potassium ions.

As a little small compressive stress is produced in a deeper portion of the chemically strengthened glass by ion exchange between lithium ions and sodium ions, it is preferable that the base composition of the chemically strengthened glass includes $Li_2O$. It is preferable that the content of $Li_2O$ be 5 mol % or more, even preferably 6 mol % or more and further preferably 8 mol % or more. There are no particular limitations on the upper limit of the content of $Li_2O$. From the viewpoint of preventing devitrification at the time of glass forming, it is preferable that the content of $Li_2O$ be 14 mol % or less, even preferably 12 mol % or less and further preferably 11 mol % or less.

A region that is deeper than a surface portion where compressive stress is produced by potassium ions and in which a compressive stress layer is formed by sodium ions is referred to as a "deep layer" of the chemically strengthened glass.

From the viewpoint of increasing the strength at the time of dropping, it is preferable that the stress depth of the deep layer of the chemically strengthened glass be (0.01×t) or more, even preferably (0.012×t) or more, further preferably (0.1×t) or more, even further preferably (0.12×t) or more, and particularly preferably (0.15×t) or more, where t is the thickness of the chemically strengthened glass. From the viewpoint of preventing the glass from breaking to pieces, it is preferable that the stress depth of the deep layer be (0.25×t) or less, even preferably (0.23×t) or less and further preferably (0.21×t) or less.

A stress depth of the deep layer of the chemically strengthened glass can be measured by a scattered light photoelastic stress meter.

There are no particular limitations on the thickness t of the chemically strengthened glass. However, where the chemically strengthened glass is used as a cover glass of a mobile device, it is preferable that the thickness t be 0.1 mm or more, even preferably 0.2 mm or more and further preferable 0.5 mm or more. And it is preferable that the thickness t be 2.5 mm or less, even preferably 1.5 mm or less and further preferably 1 mm or less. Where the chemically strengthened glass is used for an image display device such as a display device, a car navigation device, a console panel, or an instrument panel, it is preferable that the thickness t be 0.1 mm or more, even preferably 0.2 mm or more and further preferably 0.5 mm or more. And it is preferable that the thickness t be 2.1 mm or less, even preferably 1.8 mm or less and further preferably 1.5 mm or less.

If the chemically strengthened glass has, for example, a specific base composition described below, it is easy to form a preferable stress profile by chemically strengthening treatment.

In mole percentage on an oxide basis, it is preferable that $SiO_2$ be contained at 50-80%, $Al_2O_3$ at 8-20%, $B_2O_3$ at 0-10%, $Li_2O$ at 5-14%, and $Na_2O$ at 2-12%, $K_2O$ at 0-10% and that the total content (MgO+CaO+SrO+BaO) of MgO, CaO, SrO, and BaO be 0-10% and the total content ($ZrO_2$+$TiO_2$) of $ZrO_2$ and $TiO_2$ be 0-5%.

The individual components of the glass composition will be described below in detail.

$SiO_2$ is not only a component that constitutes the framework of the glass but also a component for increasing the chemical durability and for reducing the probability of occurrence of cracks when a glass surface is scratched. It is preferable that the content of $SiO_2$ be 50% or more, even preferably 55% or more and further preferably 58% or more.

To increase the meltability of the glass, it is preferable that the content of $SiO_2$ be 80% or less, even preferably 75% or less and further preferably 70% or less.

$Al_2O_3$ is not only a component that is effective at increasing the ion exchangeability at the time of chemical strengthening and increasing the surface compressive stress after the strengthening but also a component for increasing the glass transition temperature (Tg) and the Young's modulus. It is preferable that the content of $Al_2O_3$ be 8% or more, even preferably 10% or more and further preferably 12% or more.

To increase the meltability, it is preferable that the content of $Al_2O_3$ be 20% or less, even preferably 18% or less and further preferably 15% or less.

Although $B_2O_3$ is not indispensable, it may be added to, for example, increase the meltability at the time of glass manufacture. Where $B_2O_3$ is contained, it is preferable that its content be 0.5% or more, even preferably 1% or more and further preferably 2% or more.

To prevent a phenomenon that striae occur at the time of melting to lower the quality of glass to be subjected to chemically strengthening treatment, it is preferable that the content of $B_2O_3$ be 10% or less, even preferably 8% or less, further preferably 5% or less, even further preferably 3% or less, and particularly preferably 1% or less. To increase the acid resistance, it is preferable that substantially no $B_2O_3$ be contained.

In this specification, the expression "substantially no (substance name) is contained" means that the substance is not contained except for unavoidable impurity contained in a raw material etc., that is, the substance is not added intentionally. More specifically, this expression means that the content of the substance in the glass base composition is less than 0.1 mol %.

$Li_2O$ is a component that is necessary to produce compressive stress to a deep layer of the glass by ion exchange. It is preferable that $Li_2O$ be contained in the above-mentioned range.

$Na_2O$ is a component for forming a surface compressive stress layer by ion exchange with potassium ions at the time of chemically strengthening treatment. It is preferable that $Na_2O$ be contained in the above-mentioned range.

Although $K_2O$ is not indispensable, it may be added to increase the glass meltability and suppress occurrence of devitrification. It is preferable that the content of $K_2O$ be 0.5% or more, even preferably 1% or more and further preferably 1.2% or more.

To increase the compressive stress produced by ion exchange, it is preferable that the content of $K_2O$ be 10% or less, even preferably 9% or less and further preferably 8% or less.

Each of alkali metal oxides such as $Li_2O$, $Na_2O$, and $K_2O$ is a component for decreasing the glass melting temperature. It is preferable that the total content ($Li_2O+Na_2O+K_2O$) of $Li_2O$, $Na_2O$, and $K_2O$ be 7% or more, even preferably 9% or more, further preferably 11% or more, and even further preferably 13% or more.

To maintain the glass strength, it is preferable that the total content ($Li_2O+Na_2O+K_2O$) of $Li_2O$, $Na_2O$, and $K_2O$ be 24% or less, even preferably 20% or less.

Whereas each of alkali earth metal oxides such as MgO, CaO, SrO, and BaO is a component for increasing the glass meltability, it has a tendency of lowering the ion exchange performance.

It is therefore preferable that the total content (MgO+ CaO+SrO+BaO) of MgO, CaO, SrO, and BaO be 10% or less, even preferably 5% or less.

Where any of MgO, CaO, SrO, and BaO should be contained, it is preferable that MgO be contained to increase the strength of the chemically strengthened glass.

Where MgO is contained, it is preferable that its content be 0.1% or more, even preferably 0.3% or more and further preferably 0.5% or more.

To enhance the ion exchange performance, it is preferable that the content of MgO be 10% or less, even preferably 5% or less.

Where CaO is contained, it is preferable that its content be 0.1% or more, even preferably 0.2% or more, further preferably 0.5% or more, and particularly preferably 1% or more.

From the viewpoint of enhancing the ion exchange performance, it is preferable that the content of CaO be 5% or less, even preferably 1% or less. It is further preferable that substantially no CaO be contained.

Where SrO is contained, it is preferable that its content be 0.5% or more, even preferably 1% or more.

To enhance the ion exchange performance, it is preferable that the content of SrO be 5% or less, even preferably 1% or less. It is further preferable that substantially no SrO be contained.

Where BaO is contained, it is preferable that its content be 0.5% or more, even preferably 1% or more.

To enhance the ion exchange performance, it is preferable that the content of BaO be 5% or less, even preferably 1% or less. It is further preferable that substantially no BaO be contained.

ZnO is a component for increasing the glass meltability and may be contained. Where ZnO is contained, it is preferable that its content be 0.2% or more, even preferably 0.5% or more.

To enhance the glass weather resistance, it is preferable that the content of ZnO be 5% or less, even preferably 1% or less. It is further preferable that substantially no ZnO be contained.

$TiO_2$ is a component for enhancing the crushability of the chemically strengthened glass and may be contained. Where $TiO_2$ is contained, it is preferable that its content be 0.1% or more.

To suppress devitrification at the time of melting, it is preferable that the content of $TiO_2$ be 5% or less, even preferably 1% or less. It is further preferable that substantially no $TiO_2$ be contained.

$ZrO_2$ is a component for increasing the surface compressive stress produced by ion exchange and may be contained. Where $ZrO_2$ is contained, it is preferable that its content be 0.3% or more, even preferably 0.5% or more, further preferably 0.7% or more, and even further preferably 1% or more.

To suppress devitrification at the time of melting, it is preferable that the content of $ZrO_2$ be 5% or less, even preferably 3% or less.

It is preferable that the total content ($TiO_2+ZrO_2$) of $TiO_2$ and $ZrO_2$ be 5% or less, even preferably 3% or less.

$Y_2O_3$, $La_2O_3$, and $Nb_2O_5$ are components for enhancing the crushability of the chemically strengthened glass and may be contained. Where these components are contained from this point of view, it is preferable that the content of each of these components be 0.5% or more, even preferably 1% or more, further preferably 1.5% or more, even further preferably 2% or more, and particularly preferably 2.5% or more.

To make glass devitrification less prone to occur at the time of melting and thereby prevent quality deterioration of the chemically strengthened glass, it is preferable that the total content ($Y_2O_3+La_2O_3+Nb_2O_5$) of $Y_2O_3$, $La_2O_3$, and $Nb_2O_5$ be 9% or less, even preferably 8% or less.

From the above view point, it is preferable that the content of each of $Y_2O_3$, $La_2O_3$, and $Nb_2O_5$ be 3% or less, even preferably 2% or less, further preferably 1% or less, even further preferably 0.7% or less, and particularly preferably 0.3% or less.

Small contents of $Ta_2O_5$ and $Gd_2O_3$ may be added to enhance the crushability of the chemically strengthened glass. To prevent the refractive index and reflectance from becoming too high, it is preferable that the content of each of $Ta_2O_5$ and $Gd_2O_3$ be 1% or less, even preferably 0.5% or less. It is further preferable that substantially no $Ta_2O_3$ and $Gd_2O_3$ be contained.

$P_2O_5$ may be contained to enhance the ion exchange performance. Where $P_2O_5$ is contained, it is preferable that its content be 0.5% or more, even preferably 1% or more.

To increase the chemical durability, it is preferable that the content of $P_2O_5$ be 2% or less. It is even preferable that substantially no $P_2O_5$ be contained.

Where the glass is used in a colored state, a coloring component may be added in such a content range as not to obstruct attainment of desired chemical strengthening properties. For example, preferable coloring components are $Co_3O_4$, $MnO_2$, $Fe_2O_3$, $NiO$, $CuO$, $Cr_2O_3$, $V_2O_5$, $Bi_2O_3$, $SeO_2$, $TiO_2$, $CeO_2$, $Er_2O_3$, and $Nd_2O_3$. They may be added either singly or in combination.

To suppress occurrence of glass devitrification, it is preferable that the total content of coloring components be 7% or less, even preferably 5% or less, further preferably 3% or less, and even further preferably 1% or less. When it is desired to make the visible light transmittance of the glass high, it is preferable that substantially none of these coloring components be contained.

$SO_3$, a chloride, a fluoride, or the like may be added as appropriate as a refining agent at the time of glass melting. It is preferable that substantially no $As_2O_3$ be contained. Where $Sb_2O_3$ is contained, it is preferable that its content be 0.3% or less, even preferably 0.1% or less. It is most preferable that substantially no $Sb_2O_3$ be contained.

(Low Refractive Index Film)

The low refractive index film employed in the embodiment is lower in refractive index than the chemically strengthened glass.

There are no particular limitations on the refractive index nm of the low refractive index film as long as it is lower in refractive index than the chemically strengthened glass. However, from the viewpoint of making interference fringes clear, it is preferable that the refractive index nm be 1.52 or less, even preferably 1.50 or less, further preferably 1.48 or less, and most preferably 1.45 or less. On the other hand, from the viewpoint of preventing a phenomenon that total reflection occurs at the interface between the chemically strengthened glass and the low refractive index film and measurement by a surface stress meter is thereby made difficult, it is preferable that the refractive index nm be 1.25 or more, even preferably 1.30 or more and further preferably 1.35 or more.

From the viewpoint of suppressing expansion of propagation light, it is preferable that the thickness of the low refractive index film be 2 nm or more, even preferably 5 nm or more, further preferably 8 nm or more, even further preferably 10 nm or more, and particularly preferably 15 nm or more. From the viewpoint of preventing a phenomenon that total reflection occurs at the interface between the chemically strengthened glass and the low refractive index film and stress measurement using a surface stress meter is thereby made difficult, it is preferable that thickness of the low refractive index film be 200 nm or less, even preferably 100 nm or less, further preferably 50 nm or less, and even further preferably 30 nm or less.

Where the low refractive index film consists of two or more layers, it is preferable that the total thickness be in the above-mentioned range.

The low refractive index film may have one or more functions selected from the group consisting of an antifouling property, water repellency, oil repellency, hydrophilicity, and lipophilicity. A low refractive index film having such a function(s) is called an "antifouling layer." It is preferable that the antifouling layer contains a fluorine-based organic compound.

Examples of the fluorine-based organic compound are compounds containing a perfluoroalkyl group and compounds containing a perfluoropolyether group. It is preferable to use a silane compound having a perfluoropolyether group.

An example of the silane compound having a perfluoropolyether group is a material containing a compound that is expressed by the following formula (A) and/or its partially hydrolyzed condensate:

$$Rf^3\!-\!Rf^2\!-\!Z^1 \qquad (A)$$

In formula (A), $Rf^3$ is a group $C_mF_{2m+1}$ (m: an integer selected from 1 to 6) and $Rf^2$ is a group $-O-(C_aF_{2a}O)_n-$ (a: an integer selected from 1 to 6; n: an integer that is larger than or equal to 1). Where n is larger than or equal to 2, the units $-C_aF_{2a}O-$ may be either the same or different from each other.

$Z^1$ is a group $-Q^2-\{CH_2CH(SiR^2{}_qX^2{}_{3-q})\}_r-H$ in which $Q^2$ is $-(CH_2)_s-$ (s: an integer selected from 1 to 12) or $-(CH_2)_s-$ containing one or more kinds selected from an ester linkage, an ether linkage, an amide linkage, an urethane linkage, and a phenylene group in which all or part of the units $-CH_2-$ may be replaced by a unit $-CF_2-$ and/or a unit $-CF(CF_3)-$. $R^2$ is a hydrogen atom or a monovalent hydrocarbon group in which the number or carbon atoms is 1 to 6 and that may contain a substituent. $X^2$ is each independently a hydroxy group or a hydrolyzable group. The subscript q is an integer selected from 0 to 2, and r is an integer selected from 1 to 20.

Examples of the hydrolyzable group as $X^2$ are an alkoxy group, an acyloxy group, a ketoxime group, an alkenyloxy group, an amino group, an aminoxy group, an amide group, an isocyanate group, and a halogen atom. Among these examples, from the viewpoint of a balance between stability and ease of hydrolysis, an alkoxy group, an isocyanate group, and a halogen atom (in particular, chlorine atom) are preferable. Among various alkoxy groups, alkoxy groups having the number of carbons of 1 to 3 are preferable and a methoxy group and an ethoxy group are even preferable.

For example, "Afluid (registered trademark) S-550" (product name, produced by AGC Inc.), "KP-801" (product name, produced by Shin-Etsu Chemical Co., Ltd.), "X-71" (product name, produced by Shin-Etsu Chemical Co., Ltd.), "KY-130" (product name, produced by Shin-Etsu Chemical Co., Ltd.), "KY-178" (product name, produced by Shin-Etsu Chemical Co., Ltd.), "KY-185" (product name, produced by Shin-Etsu Chemical Co., Ltd.), "KY-195" (product name, produced by Shin-Etsu Chemical Co., Ltd.), and "Optool (registered trademark) DSX" (product name, produced by Daikin Industries, Ltd.), which are on the market, are usable. Materials obtained by adding oil, an antistatic agent, or the like to materials on the market are also usable.

To increase the adhesiveness of the low refractive index film serving as the antifouling layer to the chemically strengthened glass, silicon dioxide, alumina, or the like may be used as an adhesion layer that is another layer of the low refractive index film. It is preferable that the adhesion layer have a composition that includes silicon dioxide as a main component. In this case, it is preferable that the adhesion layer be formed between the antifouling layer and the chemically strengthened glass.

However, as for the low refractive index film serving as the adhesion layer, the low refractive index film serving as the adhesion layer may be used singly without being formed together with the low refractive index film serving as the antifouling layer.

The chemically strengthened glass with a film is particularly useful when used as a cover glass of, for example, a mobile device such as a cellphone or a smartphone. The chemically strengthened glass with a film is also useful when used as a cover glass of a display device not intended for mobile use such as a TV receiver, a personal computer, or a touch panel. Furthermore, the chemically strengthened glass with a film is also useful when used as wall surfaces of an elevator or wall surfaces of a construction such as a house or a building, that is, an all-surface display. In addition, the chemically strengthened glass with a film is useful when used as a construction material such as a window glass, a table top, or an interior component, for example, of an automobile, an airplane, or the like as well as a cover glass of each of them, and a body having a curved surface shape.

<Manufacturing Method of Chemically Strengthened Glass with Film>

In the embodiment, glass to be subjected to chemically strengthening treatment can be manufactured by a known method. For example, glass having a sheet shape can be manufactured by a method described below.

Glass raw materials are mixed together so as to obtain glass having a desired composition, which is then melted in a glass melting furnace by heating it. Resulting molten glass is homogenized by bubbling, stirring, addition of a refining agent, etc., formed into a glass sheet having a prescribed thickness by a known forming method, and then cooled gradually. Alternatively, the molten glass may be formed into a block shape after being homogenized, cooled gradually, and then cut into a sheet shape.

Example methods for forming glass having sheet shape are a float method, a press method, a fusion method, and a down-draw method. In particular, the float method is preferable for manufacture of a large-size glass sheet. Continuous forming methods other than the float method, such as the fusion method and the down-draw method, are also preferable.

The resulting glass can be given, for example, the base composition described in the above section (Chemically strengthened glass) of <Chemically strengthened glass with film>. The same can be applied as for a preferable mode.

The thus-obtained glass is then subjected to chemically strengthening treatment, whereby chemically strengthened glass is obtained.

The chemically strengthening treatment is treatment for replacing metal ions having a small ion radius in glass with metal ions having a large ion radius by bringing the glass into contact with metal salt by, for example, a method of immersing the glass in a melt of the metal salt containing metal ions having a large ion radius. Typically, lithium ions are replaced by sodium ions or potassium ions and sodium ions are replaced by potassium ions.

To increase the rate of the chemically strengthening treatment and to cause ion exchange also in a deep layer of glass to produce stress there, it is preferable to utilize "Li—Na exchange" which replaces lithium ions in the glass with sodium ions. To produce large compressive stress at the surface by ion exchange, it is preferable to utilize "Na—K exchange" which replaces sodium ions in the glass with potassium ions.

Example molten salts to be used for the chemically strengthening treatment are a nitrate, a sulfate, a carbonate, and a chloride. Among them, example nitrates are lithium nitrate, sodium nitrate, potassium nitrate, cesium nitrate, and silver nitrate. Example sulfates are lithium sulfate, sodium sulfate, potassium sulfate, cesium sulfate, and silver sulfate. Example carbonates are lithium carbonate, sodium carbonate, and potassium carbonate. Example chlorides are lithium chloride, sodium chloride, potassium chloride, cesium chloride, and silver chloride.

One of these molten salts may be used singly or plural kinds of molten salts may be used in combination.

The treatment conditions of the chemically strengthening treatment such as a time, and a temperature are suitably selected taking a glass composition, a kind of molten salt, etc. into consideration. As a result, chemically strengthened glass is obtained in which two or less interference fringes are observed by stress measurement utilizing surface propagation light having a wavelength of 365 nm.

For example, chemically strengthened glass may be obtained by the following two-step chemically strengthening treatment.

As the first-step chemically strengthening treatment, glass is immersed in a metal salt containing sodium ions, e.g., sodium nitrate molten salt. The temperature of the metal salt is, for example, about 350° C. to 500° C., and immersion time is, for example, about 0.1 to 10 hours. As a result, ion exchange occurs between lithium ions in the glass and sodium ions in the metal salt, whereby a compressive stress layer in which, for example, a surface compressive stress is 200 MPa or more and a compressive stress layer depth is 80 μm or more is formed.

If the surface compressive stress obtained by the first-step treatment is larger than 1,000 MPa, it may be difficult to increase the compressive stress layer depth (DOL) while keeping the internal stress (CT) small in chemically strengthened glass obtained finally. It is therefore preferable that the surface compressive stress obtained by the first-step treatment be 900 MPa or less, even preferably 700 MPa or less and further preferably 600 MPa or less.

As the second-step chemically strengthening treatment, the glass that has been subjected to the first-step treatment is immersed in a metal salt containing potassium ions, e.g., potassium nitrate molten salt. The temperature of the metal salt is higher than or equal to the melting temperature of the metal salt. From the viewpoint of allowing the ion exchange to proceed, it is preferable that the temperature of the metal salt be 350° C. or more, even preferably 370° C. or more and further preferably 390° C. or more. From the viewpoint of allowing the ion exchange to proceed, it is preferable that the time of immersion in the metal salt be 10 minutes or more, even preferably 20 minutes or more and further preferably 30 minutes or more.

On the other hand, from the viewpoint of making the number of interference fringes observed in stress measurement utilizing surface propagation light having a wavelength of 365 nm being two or less, it is preferable that the temperature of the metal salt be 440° C. or less, even preferably 420° C. or less and further preferably 400° C. or less. From the same point of view, it is preferable that the time of immersion in the metal salt be 90 minutes or less, even preferably 70 minutes or less and further preferably 50 minutes or less.

One example of chemically strengthening treatment has been described above. Alternatively, three-step chemically strengthening treatment may be performed. In each stage of the chemically strengthening treatment, metal salt may contain plural kinds of alkali metal ions such as lithium ions and sodium ions, sodium ions and potassium ions, or lithium ions, sodium ions, and potassium ions.

To perform such two-step or three-step chemically strengthening treatment, from the viewpoint of efficiency of manufacture, it is preferable that the total treatment time be 10 hours or less, even preferably 5 hours or less and further preferably 3 hours or less. On the other hand, to obtain a desired stress profile, it is preferable that the total treatment time be 0.5 hours or more, even preferably 1 hour or more.

The chemically strengthened glass of the embodiment that is obtained in the above-described manner may have a shape other than a sheet shape according to a product, use, or the like to which it is applied. The chemically strengthened glass may have a chamfered shape in which outer circumferential portions are different in thickness. The shape of the chemically strengthened glass is not limited to these shapes; for example, the two main surfaces need not always be parallel with each other and all or part of one or both of the two main surfaces may be a curved surface. More specifically, for example, the chemically strengthened glass may be a flat-sheet-shaped glass sheet having no warp or a curved glass sheet having a curved surface.

Organic substances sticking to the surfaces may be removed by immersing the obtained chemically strengthened glass in an alkali solution. Alternatively, organic substances sticking to the surfaces may be removed by irradiating the main surfaces of the chemically strengthened glass with plasma in the atmosphere.

Removal of organic substances sticking to the surfaces is preferable because it increases the adhesiveness to a film formed on a main surface and thereby increases the durability.

A low refractive index film is formed on a main surface of the chemically strengthened glass. The method for forming a low refractive index film varies depending on the kind of film to be formed.

Where the low refractive index film is an adhesion film for increasing the adhesiveness, a film can be formed by a chemical vapor deposition (CVD) method or a physical vapor deposition (PVD) method. Examples of the physical vapor deposition method are a vacuum deposition method, an ion-assisted sputtering (IAD) method, a sputtering method, a post-oxidation sputtering method, an ion-assisted sputtering method, an ion beam sputtering method, and an ion-beam-assisted deposition method. Among these methods, the ion-assisted sputtering method, the post-oxidation sputtering method, and the ion-beam-assisted deposition method are preferable in that the hardness of an adhesion layer can be increased relatively easily.

From the viewpoint of increasing the hardness of an adhesion layer, it is preferable that the pressure in a chamber at the time of vacuum deposition be 0.15 Pa or less, even preferably 0.1 Pa or less and further preferably 0.08 Pa or less. From the viewpoint of maintaining plasma discharge stably, it is preferable that the pressure be 0.03 Pa or more.

It is preferable that the material for the vacuum deposition to form an adhesion layer be silicon dioxide ($SiO_2$). The material is set in a heating container and evaporated by heating it under a low vacuum, whereby a film is formed on a main surface of glass that is set to be opposed to the heating container.

Where the sputtering method is employed, from the viewpoint of increasing the hardness of a film, it is preferable that the discharge power at the time of film formation be 5,000 W or more, even preferably 7,000 W or more. From the viewpoint of preventing cracking of a target and abnormal discharge, it is preferable that the discharge power be 20,000 W or less.

During the formation of an adhesion film, it is preferable that the adhesion film is exposed to high energy particles from a plasma source, an ion source, or a radical source, or the like, that is, plasma assistance is performed. It is preferable that plasma assistance be performed every time when a film of 100 nm or thinner is formed, even preferably every time when a film of 1 nm or thinner is formed and further preferably every time when a film of 0.5 nm or thinner is formed.

Although there are no particular limitations on the type of a high-energy particle source, it is preferable to use an ion beam, a radical source, an ECR (electron cyclotron resonance) plasma source or the like, such as a plasma beam, an ion beam, a linear ion beam, an ECR plasma source, a radical source, or a low-impedance antenna plasma source.

It is preferable to execute the above process using, for example, a sputtering machine (e.g., "RAS1100B II" produced by Shincron Co., Ltd.) capable of performing a post-oxidation sputtering method.

In the case of forming an $SiO_2$ film as an adhesion layer, it is preferable to employ an Si target, to use argon gas and oxygen gas as discharge gas in a film forming chamber, and to use argon and oxygen as discharge gas in a reaction chamber. In the above-mentioned machine, a drum that holds a substrate is set in a vacuum chamber that is divided into a film forming chamber and a reaction chamber and rotated at, for example, 100 rpm while passing through the film forming chamber and the reaction chamber alternately at high speed. As a result, a thin film that is as very thin as several nanometers or less is formed in the film forming chamber. Subsequently, activated gas that has reacted with a plasma source energy may be used to apply energy to the film that has been sent to the reaction chamber or to react with portions of the film which has not reacted yet.

To increase the hardness of an adhesion layer, it is preferable to use such a machine capable of performing post-oxidation process. Furthermore, it is preferable to apply energy to an $SiO_2$ film by using the plasma source in the reaction chamber after the $SiO_2$ film which has been sufficiently oxidized has been formed in the film forming chamber.

In the case where a low refractive index film is an antifouling layer having one or more functions selected from the group consisting of an antifouling property, water repellency, oil repellency, hydrophilicity, and lipophilicity, a wet method such as a spin coating method, a dip coating method, a casting method, a slit coating method, or a spray coating method or a dry method such as a vacuum deposition method is used.

To form an antifouling layer that is high in adhesion and wear resistance, it is preferable to employ a vacuum deposition method. Examples of the vacuum deposition method are a resistance heating method, an electron beam heating method, a high-frequency induction heating method, a reactive deposition method, a molecular beam epitaxy method, a hot wall deposition method, an ion plating method, and a cluster ion beam method. Among these methods, the resistance heating method is preferable because a machine used is simple and hence the cost is low.

An antifouling layer may be formed on a main surface of chemically strengthened glass either directly or via another layer such as an adhesion layer.

From the viewpoint of performing vacuum deposition without causing any problem, it is preferable that the pressure in the chamber at the time of the vacuum deposition be 5×10⁻³ Pa or less. From the viewpoint of keeping deposition rate of the antifouling layer at a prescribed rate or more, it is preferable that the pressure in the chamber at the time of the vacuum deposition be 1×10⁻⁴ Pa or more.

From the viewpoint of preventing water absorption on an antifouling layer and thereby forming the film stably, it is preferable that the deposition power as converted into a current density be 200 kA/m² or more, even preferably 300 kA/m² or more and further preferably 350 kA/m² or more. From the viewpoint of preventing evaporation of components of steel wool impregnated with a material of an antifouling layer and components of a crucible, it is preferable that the deposition power be 1,000 kA/m² or less.

It is preferable that a deposition material be held in such a manner that a fluorine-based organic compound to constitute an antifouling layer is impregnated in a pellet-shaped copper container. It is preferable to perform impregnation work in a nitrogen atmosphere. This increases the number of layers in which a fluorine-based organic compound is deposited as monoatomic molecules is increased, whereby a resulting antifouling layer is increased in wear resistance.

In the case where the low refractive index film is an antireflection on layer, for example, it can be formed by a chemical vapor deposition (CVD) method or a physical vapor deposition (PVD) method. Examples of the physical vapor deposition method are a vacuum deposition method and a sputtering method.

<Surface Stress Measuring Method>

The measurement target of the surface stress measuring method of the embodiment is a chemically strengthened glass having two or less interference fringes observed under stress measurement that utilizes surface propagation light having a wavelength of 365 nm. The chemically strengthened glass has a pair of main surfaces opposing each other.

When the chemically strengthened glass alone is subjected to stress measurement utilizing surface propagation light having a wavelength of 365 nm, the number of interference fringes observed is two or less and the interference fringes are unclear because of a small stress depth, and thus the measurement of surface compressive stress is difficult or impossible.

However, in the case where a chemically strengthened glass with a film in which at least one main surface of chemically strengthened glass is formed with a film that is lower in refractive index than the chemically strengthened glass is used, clear interference fringes are obtained and surface compressive stress can be measured easily.

That is, the surface stress measuring method of the embodiment includes the following steps (1) and (2):

(1) A step of obtaining a chemically strengthened glass with a film by forming a film (low refractive index film) that is lower in refractive index than the chemically strengthened glass on at least one of main surfaces of the chemically strengthened glass having two or less interference fringes observed under stress measurement utilizing surface propagation light having a wavelength of 365 nm.

(2) A step of measuring surface compressive stress of the chemically strengthened glass by performing stress measurement utilizing surface propagation light on the obtained chemically strengthened glass with a film.

It becomes possible to observe interference fringes clearly in stress measurement utilizing surface propagation light by forming a low refractive index film on a main surface of the chemically strengthened glass.

Observed interference fringes become clearer and the number thereof is increased as the wavelength of surface propagation light becomes shorter. The wavelength for stress measurement is not limited to 365 nm and may be another wavelength such as 596 nm or 790 nm. From the viewpoint of making it easier to observe clear interference fringes, it is preferable that the wavelength of surface propagation light be 650 nm or less, even preferably 550 nm or less. Where "FSM-6000LEUV" produced by Orihara Industrial Co., Ltd. is used as a glass surface stress meter of Orihara Industrial Co., Ltd., the lower limit of the wavelength is 365 nm. However, if measurement at an even shorter wavelength range is possible, surface propagation light having wavelength lower than 365 nm may be used. Furthermore, measurement may be carried out using plural wavelengths.

EXAMPLES

Although Examples of the present invention will be described below, the invention is not restricted by these Examples.

Examples 1 and 6-19 are Referential Examples, Example 2 is a Comparative Example, and Examples 3-5 are Inventive Examples.

(Measuring Method)

Surface compressive stress and a surface stress depth of chemically strengthened glass were measured by a glass surface stress meter ("FSM-6000LEUV" produced by Orihara Industrial Co., Ltd.). The wavelength of a light source of surface propagation light was 365 nm.

A stress depth of a deep layer and tensile stress in a glass central portion of the chemically strengthened glass were measured by a scattered light photoelastic stress meter ("SLP2000" produced by Orihara Industrial Co., Ltd.).

A refractive index of the chemically strengthened glass was measured by a Kalnew precision refractive index meter "KPR-2000" produced by Shimadzu Corporation. As for a refractive index of a low refractive index film, a value calculated according to conventional knowledge was used.

Example 1

Glass raw materials were mixed so as to obtain each of compositions shown in Table 1 in mole percentage on an oxide basis, and were subjected to heat melting. Resulting molten glass was then homogenized and cooled gradually. Resulting glass was formed and processed into a glass sheet of 50 mm×50 mm having a thickness t of 0.70 mm. Blanks in Table 1 mean that the corresponding materials are not contained except for impurities that are contained in the raw materials unavoidably, that is, they are not contained intentionally.

The glass sheet obtained was subjected to first-step chemically strengthening treatment by immersing it in NaNO₃ molten salt of 380° C. for 150 minutes. Then the glass sheet was subjected to second-step chemically strengthening treatment by immersing it in KNO₃ molten salt of 450° C. for 60 minutes, whereby chemically strengthened glass was obtained.

The chemically strengthened glass obtained was subjected to measurement of surface compressive stress, a surface stress depth, a stress depth of a deep layer, and tensile stress.

FIG. 1 shows an image obtained by measurement using a surface stress meter. The upper half of FIG. 1 is an image obtained by measurement using P-polarized light in which six clear interference fringes were observed. The lower half of FIG. 1 is an image obtained by measurement using S-polarized light in which five clear interference fringes were observed.

This chemically strengthened glass had a surface compressive stress of 990 MPa, a surface stress depth of 7.5 μm, a deep layer stress depth of 127 μm, and a tensile stress of 84 MPa.

[Table 1]

TABLE 1

| | Ex. 1 to Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|---|---|---|
| | (mol %) | | | | | | | | | | | | | | |
| $SiO_2$ | 69 | 68.9 | 68.9 | 68.9 | 68.8 | 68.8 | 68.5 | 67.6 | 66.4 | 64.3 | 65.7 | 66.5 | 67.8 | 66.4 | 66.5 |
| $Al_2O_3$ | 13 | 12.4 | 12.0 | 12.2 | 12.0 | 12.0 | 12.0 | 13.0 | 12.4 | 12.4 | 13.0 | 13.0 | 12.4 | 12.2 | 12.0 |
| MgO | | 0.1 | 0.3 | 0.3 | 0.1 | 0.3 | 0.3 | 0.1 | 3.0 | 5.0 | 3.0 | 3.0 | 0.6 | 2.0 | 3.0 |
| CaO | | 0.1 | 0.1 | 0.1 | 0.2 | 0.2 | 0.2 | 0.1 | 0.1 | 0.1 | 0.1 | 0.1 | 0.1 | 0.1 | 0.1 |
| $TiO_2$ | | 0.1 | 0.1 | 0.1 | 0.1 | 0.1 | 0.1 | 0.1 | 0.1 | 0.1 | 0.1 | 0.1 | 0.1 | 0.1 | 0.1 |
| $ZrO_2$ | | 0.3 | 0.3 | 0.3 | 0.7 | 0.5 | 1.0 | 0.3 | 0.3 | 0.3 | 0.3 | 0.3 | 0.5 | 0.5 | 0.9 |
| $Y_2O_3$ | 1 | 1.3 | 1.5 | 1.3 | 1.3 | 1.3 | 1.1 | 1.3 | 1.3 | 1.3 | 1.3 | 1.3 | 2.0 | 2.0 | 0.9 |
| $Li_2O$ | 11 | 10.8 | 10.8 | 10.8 | 10.8 | 10.8 | 10.8 | 11.0 | 10.6 | 10.6 | 10.6 | 10.6 | 10.6 | 10.6 | 10.6 |
| $Na_2O$ | 5 | 4.8 | 4.8 | 4.8 | 4.8 | 4.8 | 4.8 | 4.7 | 4.7 | 3.9 | 4.7 | 3.2 | 4.7 | 4.9 | 4.7 |
| $K_2O$ | 1 | 1.2 | 1.2 | 1.2 | 1.2 | 1.2 | 1.2 | 1.8 | 1.2 | 2.0 | 1.2 | 2.0 | 1.2 | 1.2 | 1.2 |
| Total | 100 | 100 | 100 | 100 | 100 | 100 | 100 | 100 | 100 | 100 | 100 | 100 | 100 | 100 | 100 |

Example 2

A glass sheet was obtained in the same manner as in Example 1 except that the glass thickness t was 0.75 mm.

The glass sheet obtained was subjected to first-step chemically strengthening treatment by immersing it in $NaNO_3$ molten salt of 380° C. for 140 minutes. Then the glass sheet was subjected to second-step chemically strengthening treatment by immersing it in $KNO_3$ molten salt of 390° C. for 50 minutes, whereby chemically strengthened glass was obtained.

The chemically strengthened glass obtained was subjected to measurement of a surface compressive stress, a surface stress depth, a stress depth of a deep layer, and a tensile stress.

Figure 2:
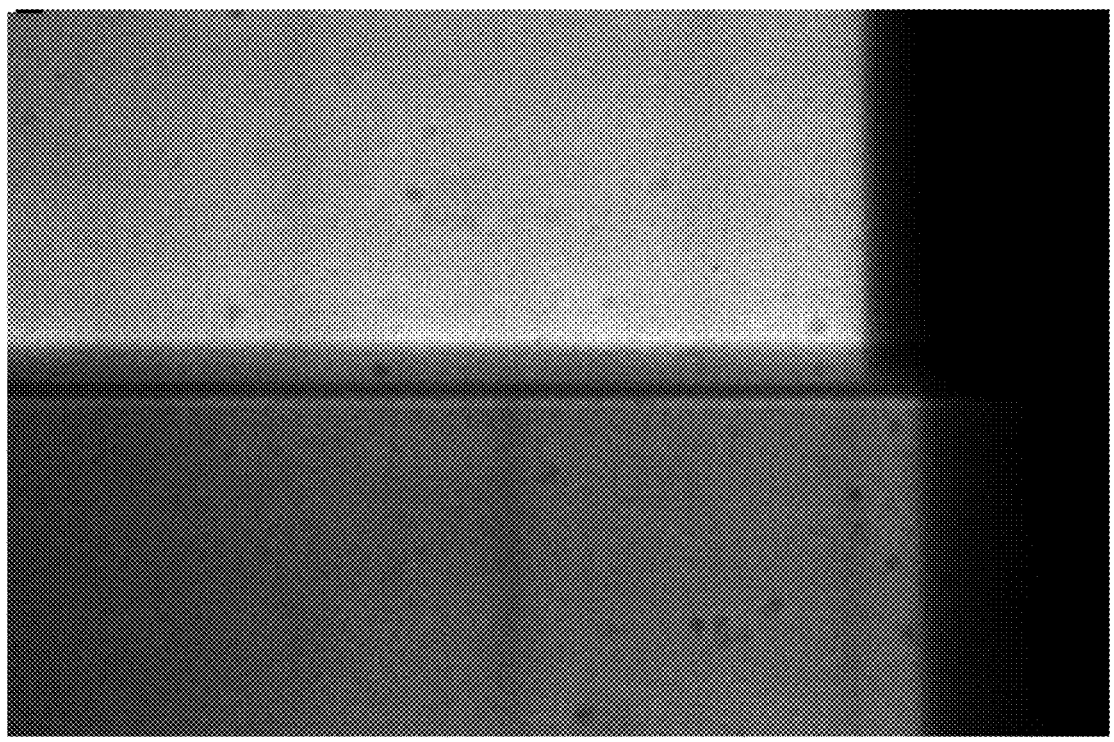
FIG. 2 shows an image of interference fringes obtained by performing measurement on chemically strengthened glass of Example 2 using a surface stress meter.

FIG. 2 shows an image obtained by measurement using the surface stress meter. The upper half of FIG. 2 is an image obtained by measurement using P-polarized light in which two unclear interference fringes were observed. The lower half of FIG. 2 is an image obtained by measurement using S-polarized light in which two unclear interference fringes were observed. In either case, neither a surface compressive stress nor a surface stress depth was determined by automatic measurement using the surface stress meter. Thus, a surface compressive stress and a surface stress depth were determined by visually determining positions of the interference fringes in the image of FIG. 2.

This chemically strengthened glass had a surface compressive stress of 1,220 MPa, a surface stress depth of 2.9 μm, a deep layer stress depth of 106 μm, and a tensile stress of 65 MPa.

Example 3

Chemically strengthened glass was obtained in the same manner as in Example 2. The chemically strengthened glass obtained was cleaned by immersing it in pure water and an alkaline detergent. Then plasma cleaning was performed by irradiating a main surface, located on the side for film formation, of the chemically strengthened glass with plasma.

Subsequently, a low refractive index film A was formed on the main surface of the chemically strengthened glass by a vacuum deposition method with resistance heating using a fluorine-based organic compound ("UD-509" produced by Daikin Industries, Ltd.) as a material, whereby a chemically strengthened glass with a film was obtained. This was done in such a manner that material liquid was impregnated in steel wool provided in a pellet-shaped copper container in a nitrogen atmosphere and the material was supported by the container by evacuation. The low refractive index film A was formed by depositing the material for 300 sec at deposition power of 318.5 kA/m$^2$ with the pressure in the vacuum chamber set at 3.0×10$^{-3}$ Pa. The low refractive index film A formed had a thickness of 15 nm.

Whereas the refractive index of the chemically strengthened glass was 1.54 at a wavelength of 365 nm and 1.52 at a wavelength of 589 nm, the refractive index of the low refractive index film A was in a range of 1.40 to 1.42 at a wavelength of 589 nm. That is, the difference between the refractive indices of the low refractive index film A and the chemically strengthened glass was 0.10 to 0.12.

Figure 3:
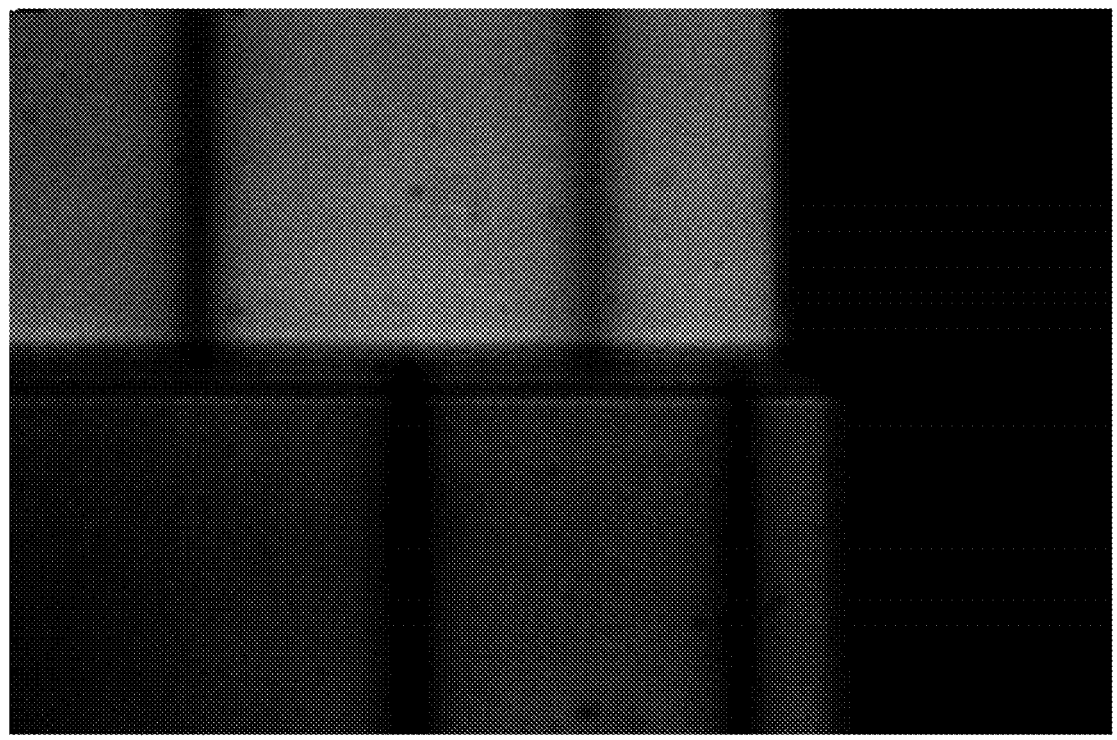
FIG. 3 shows an image of interference fringes obtained by performing measurement on chemically strengthened glass with a film of Example 3 using a surface stress meter.

FIG. 3 shows an image obtained by measurement using the surface stress meter. The upper half of FIG. 3 is an image obtained by measurement using P-polarized light and the lower half of FIG. 3 is an image obtained by measurement using S-polarized light. In either case, in contrast to the case of Example 2 in which the low refractive index film A was not formed, clear interference fringes were observed and hence automatic measurement using the surface stress meter was possible.

This chemically strengthened glass had a surface compressive stress of 1,220 MPa, a surface stress depth of 2.9 μm, a deep layer stress depth of 106 μm, and a tensile stress of 65 MPa.

Example 4

Chemically strengthened glass was obtained in the same manner as in Example 2. The chemically strengthened glass obtained was cleaned by immersing it in pure water and an alkaline detergent. Then plasma cleaning was performed by irradiating a main surface, located on the side for film formation, of the chemically strengthened glass with plasma.

Subsequently, a low refractive index film B was formed on the main surface of the chemically strengthened glass by a sputtering method. A sputtering machine "RAS1100B II" produced by Shincron Co., Ltd. was used. The low refractive index film B was an $SiO_2$ film and polycrystalline silicon (produced by Chemiston Inc., purity 5N) was used as a sputtering target. After checking that the pressure in a film forming chamber became $5 \times 10^{-5}$ Pa or less, argon was introduced into the film forming chamber at 80 sccm as discharge gas and electric power of 7,500 W was applied to the sputtering target. Subsequently, oxygen was introduced into the reaction chamber at 110 sccm, and then discharging was performed with the electric power of an RF plasma source set at 3,000 W. Under the above conditions, the low refractive index film B was formed at a thickness of 5 nm.

Furthermore, a low refractive index film A was formed on the low refractive index film B in the same manner as in Example 3, whereby a chemically strengthened glass with a film was obtained. The thickness of the low refractive index film A was 15 nm.

Whereas the refractive index of the chemically strengthened glass was 1.54 at a wavelength of 365 nm and 1.52 at a wavelength of 589 nm, the refractive index of the low refractive index film A was in a range of 1.40 to 1.42 at a wavelength of 589 nm. That is, the difference between the refractive indices of the low refractive index film A and the chemically strengthened glass was 0.10 to 0.12. The refractive index of the low refractive index film B was 1.49 at a wavelength of 365 nm and 1.47 at a wavelength of 589 nm. That is, the difference between the refractive indices of the low refractive index film B and the chemically strengthened glass was 0.05.

Figure 4:
FIG. 4 shows an image of interference fringes obtained by performing measurement on chemically strengthened glass with a film of Example 4 using a surface stress meter.

FIG. 4 shows an image obtained by measurement using the surface stress meter. The upper half of FIG. 4 is an image obtained by measurement using P-polarized light and the lower half of FIG. 4 is an image obtained by measurement using S-polarized light. In either case, in contrast to the case of Example 2 in which neither the low refractive index film A nor the low refractive index film B was formed, clear interference fringes were observed and hence automatic measurement using the surface stress meter was possible.

This chemically strengthened glass had a surface compressive stress of 1,240 MPa, a surface stress depth of 2.9 µm, a deep layer stress depth of 106 µm, and a tensile stress of 65 MPa.

Example 5

Chemically strengthened glass with a film was obtained in the same manner as in Example 4 except that the thickness of a low refractive index film B was 10 nm. Film forming conditions of the low refractive index film B were as follows.

Argon was introduced into the film forming chamber at 80 sccm as discharge gas and electric power of 7,500 W was applied to a sputtering target. Subsequently, oxygen was introduced into the reaction chamber at 110 sccm, and then discharging was performed with the electric power of an RF plasma source set at 3,000 W. Under these conditions, a low refractive index film was formed at a thickness of 10 nm.

Whereas the refractive index of the chemically strengthened glass was 1.54 at a wavelength of 365 nm and 1.52 at a wavelength of 589 nm, the refractive index of the low refractive index film A was in a range of 1.40 to 1.42 at a wavelength of 589 nm. That is, the difference between the refractive indices of the low refractive index film A and the chemically strengthened glass was 0.10 to 0.12. The refractive index of the low refractive index film B was 1.49 at a wavelength of 365 nm and 1.47 at a wavelength of 589 nm. That is, the difference between the refractive indices of the low refractive index film B and the chemically strengthened glass was 0.05.

Figure 5:
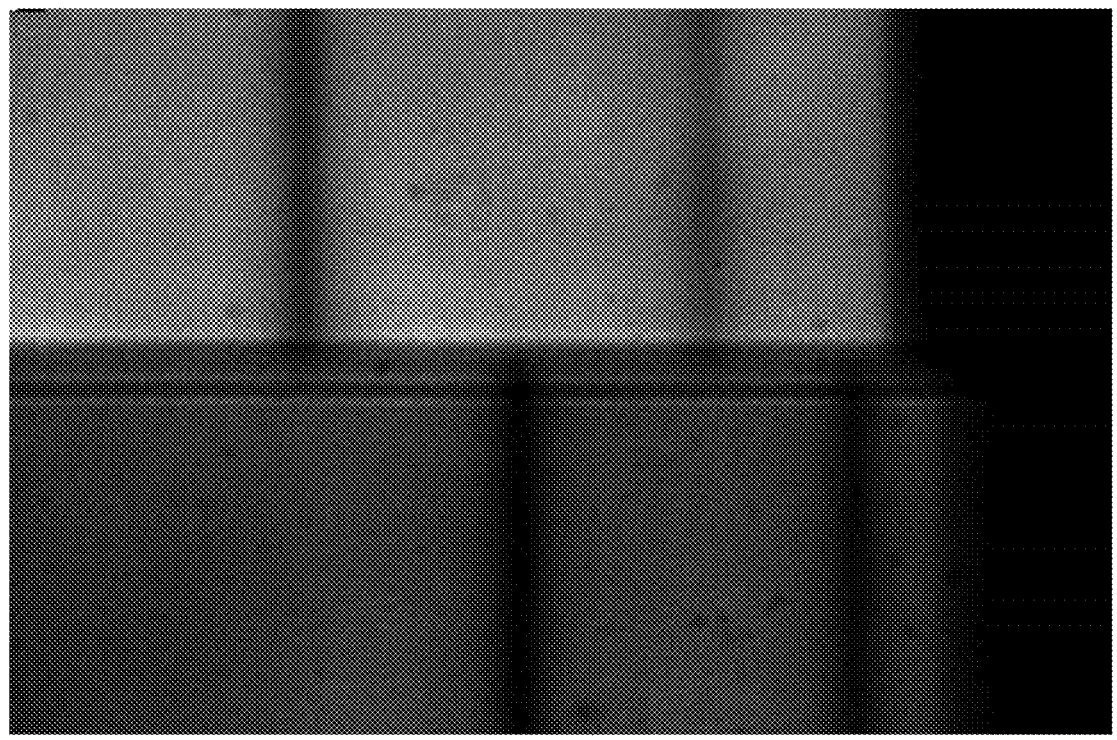
FIG. 5 shows an image of interference fringes obtained by performing measurement on chemically strengthened glass with a film of Example 5 using a surface stress meter.

FIG. 5 shows an image obtained by measurement using the surface stress meter. The upper half of FIG. 5 is an image obtained by measurement using P-polarized light and the lower half of FIG. 5 is an image obtained by measurement using S-polarized light. In either case, in contrast to the case of Example 2 in which neither the low refractive index film A nor the low refractive index film B was formed, clear interference fringes were observed and hence automatic measurement using the surface stress meter was possible.

This chemically strengthened glass had a surface compressive stress of 1,240 MPa, a surface stress depth of 2.9 µm, a deep layer stress depth of 106 µm, and a tensile stress of 65 MPa.

Examples 6-19

Chemically strengthened glass of each of Examples 6-19 was obtained in the same manner as in Example 1 except that glass raw materials were mixed so that a composition shown in Table 1 in mole percentage on an oxide basis was obtained.

It was found from the above results that if the depth of surface stress produced by ion exchange between potassium ions and sodium ions was small, interference fringes obtained by surface stress measurement became unclear and the number thereof decreased, as a result of which neither a surface compressive stress nor a surface stress depth was determined by automatic measurement using a surface stress meter.

In contrast, in the case where a low refractive index film was formed on a main surface of chemically strengthened glass, interference fringes became clear and it became possible to measure a surface compressive stress and a surface stress depth by automatic measurement.

The present invention is described in detail with reference to specific embodiments, but it is apparent for those skilled in the art that various changes or modifications can be added without departing from the spirit and the scope of the present invention. This application is based upon Japanese Patent Application (No. 2020-151342), filed on Sep. 9, 2020, the contents of which are incorporated herein by reference.

What is claimed is:

1. A chemically strengthened glass with a film, comprising:
   a chemically strengthened glass having a pair of main surfaces opposing each other; and
   a film formed on at least one of the main surfaces of the chemically strengthened glass,
   the chemically strengthened glass having a base composition comprising, in mole percentage on an oxide basis:
   68.5-80% of $SiO_2$;
   8-20% of $Al_2O_3$;
   0-10% of $B_2O_3$;
   10.6-14% of $Li_2O$;
   2-12% of $Na_2O$;
   0-10% of $K_2O$;
   0-10% of a total content (MgO+CaO+SrO+BaO) of MgO, CaO, SrO, and BaO;
   0-5% of a total content ($ZrO_2$+$TiO_2$) of $ZrO_2$ and $TiO_2$; and
   7-20% of a total content ($Li_2O$+$Na_2O$+$K_2O$) of $Li_2O$, $Na_2O$, and, $K_2O$,
   wherein the chemically strengthened glass has two or less interference fringes observed under stress measurement utilizing surface propagation light having a wavelength of 365 nm, and the film has a refractive index lower than a refractive index of the chemically strengthened glass.

2. The chemically strengthened glass with a film according to claim 1, wherein a difference between the refractive index of the film and the refractive index of the chemically strengthened glass is in a range of 0.02 to 0.30.

3. The chemically strengthened glass with a film according to claim 1, Wherein a stress depth of a deep layer of the chemically strengthened glass is 0.1×t or more, where t is a thickness of the chemically strengthened glass.

4. The chemically strengthened glass with a film according to claim 1, wherein the film has a thickness in a range of 2 nm to 50 nm.

5. The chemically strengthened glass with a film according to claim 1, wherein the film comprises a fluorine-based organic compound.

6. The chemically strengthened glass with a film according to claim 1, wherein a surface stress depth formed by potassium ions is 4 μm or less.

7. The chemically strengthened glass with a film according to claim 1, wherein a surface stress depth formed by potassium ions is 2.9 μm or less.

8. The chemically strengthened glass with a film according to claim 1, wherein the content of $Li_2O$ is 5% or more and 12% or less.

9. The chemically strengthened glass with a film according to claim 1, wherein the total content (MgO+CaO+SrO+BaO) of MgO, CaO, SrO, and BaO is 0% or more and 5% or less.

10. A surface stress measuring method for a chemically strengthened glass having a pair of main surfaces opposing each other, the method comprising:
    obtaining a chemically strengthened glass with a film according to claim 1, by forming a film having a refractive index lower than a refractive index of the chemically strengthened glass on at least one of the main surfaces of the chemically strengthened glass; and
    measuring a surface compressive stress of the chemically strengthened glass by performing stress measurement utilizing surface propagation light on the chemically strengthened glass with a film,
    wherein the chemically strengthened glass has two or less interference fringes observed under stress measurement utilizing surface propagation light having a wavelength of 365 nm.

11. The surface stress measuring method for a chemically strengthened glass according to claim 10, wherein the surface propagation light to be applied to the chemically strengthened glass with a film has a wavelength of 650 nn or less.

* * * * *